(12) United States Patent
Lin et al.

(10) Patent No.: US 10,855,161 B2
(45) Date of Patent: Dec. 1, 2020

(54) HYBRID STEP MOTOR WITH GREATER NUMBER OF STATOR TEETH THAN ROTOR TEETH TO DELIVER MORE TORQUE

(71) Applicant: Lin Engineering, Inc., Morgan Hill, CA (US)

(72) Inventors: Ted T. Lin, Saratoga, CA (US); Harlan H. Nguyen, San Jose, CA (US); Nicholas A. Vergara, Campbell, CA (US)

(73) Assignee: Lin Engineering, Inc., Morgan Hill, CA (US)

( * ) Notice: Subject to any disclaimer, the term of this patent is extended or adjusted under 35 U.S.C. 154(b) by 353 days.

(21) Appl. No.: 15/597,998

(22) Filed: May 17, 2017

(65) Prior Publication Data

US 2018/0269763 A1 Sep. 20, 2018

Related U.S. Application Data

(60) Provisional application No. 62/471,680, filed on Mar. 15, 2017.

(51) Int. Cl.
*H02K 37/04* (2006.01)
*H02K 1/14* (2006.01)
*H02K 1/24* (2006.01)

(52) U.S. Cl.
CPC ............ *H02K 37/04* (2013.01); *H02K 1/146* (2013.01); *H02K 1/246* (2013.01); *H02K 2213/03* (2013.01)

(58) Field of Classification Search
CPC ........ H02K 37/04; H02K 37/02; H02K 37/00; H02K 1/146; H02K 1/246; H02K 1/24; H02K 1/14; H02K 2213/03; H02K 2213/09; H02K 19/06; H02K 19/103
USPC ....................................... 310/49.44, 216.092
See application file for complete search history.

(56) References Cited

U.S. PATENT DOCUMENTS

| 4,234,808 | A | * | 11/1980 | Geppert | ................. | H02K 37/18 |
| | | | | | | 310/156.64 |
| 4,516,048 | A | | 5/1985 | Brigham | | |
| 4,748,362 | A | * | 5/1988 | Hedlund | .............. | H02K 19/103 |
| | | | | | | 310/168 |
| 4,910,475 | A | | 3/1990 | Lin | | |
| 5,374,865 | A | | 12/1994 | Yoshimura et al. | | |
| 6,051,898 | A | | 4/2000 | Sakamoto | | |
| 7,323,834 | B2 | | 1/2008 | Kimura et al. | | |

(Continued)

*Primary Examiner* — Michael Andrews
(74) *Attorney, Agent, or Firm* — Thomas Schneck

(57) ABSTRACT

A step motor comprises both a rotor and a stator winding assembly. The rotor has a plurality Nr of rotor teeth. The rotor fits within the stator winding assembly and is seated by bearings on an axial shaft to rotate within the stator winding assembly. The stator winding assembly includes a stator with a plurality of stator poles and is wound with coils that can be driven in a series of phases to magnetically interact with the rotor. Each stator pole has a plurality of stator teeth. The total number Ns of stator teeth on all poles of the stator is equal to or greater than the number of rotor teeth (Ns≥Nr) to deliver more torque. Various embodiments of two-phase, three-phase and five-phase bipolar step motors having 8, 9 and 10 stator poles, respectively, and different numbers of teeth are provided, including two embodiments with non-uniform stators.

6 Claims, 5 Drawing Sheets

(56) References Cited

U.S. PATENT DOCUMENTS

| | | |
|---|---|---|
| 7,518,270 B2 | 4/2009 | Badgerow et al. |
| 9,006,941 B2 | 4/2015 | Zhao |
| 2008/0030108 A1 | 2/2008 | Trago et al. |
| 2011/0181135 A1* | 7/2011 | Pollock .................. H02P 8/22 |
| | | 310/49.46 |
| 2012/0086302 A1* | 4/2012 | Hashimoto ........... H02K 1/146 |
| | | 310/216.004 |
| 2014/0042837 A1 | 2/2014 | Brennvall et al. |
| 2014/0111056 A1 | 4/2014 | Lin et al. |

* cited by examiner

HYBRID STEP MOTOR WITH GREATER NUMBER OF STATOR TEETH THAN ROTOR TEETH TO DELIVER MORE TORQUE

CROSS-REFERENCE TO RELATED APPLICATION

This application claims priority under 35 U.S.C. 119(e) from prior U.S. provisional application 62/471,680 filed Mar. 15, 2017.

TECHNICAL FIELD

The present invention relates to step motors and in particular to step motor designs that maximize the holding torque within construction constraints.

BACKGROUND ART

Recently, the demand has increased for steppers to run with higher torque. This is a challenge for standard motor design, because torque depends upon the number of stator teeth that interact with the rotor. A higher number of stator teeth interacting with the rotor teeth will develop more torque.

The number of rotor teeth is the fundamental factor to determine the step angle. A full step angle (in degrees)=360°/(number of rotor teeth×number of mechanical phases). Common step angles used in the industry are: 0.36°, 0.45°, 0.6°, 0.72°, 0.9°, 1.2°, 1.8°, 3.6°, 3.75°, 7.5°, 15°, etc. corresponding respectively to 1000, 800, 600, 500, 400, 300, 200, 100, 96, 48, 24, etc. full steps per revolution. If needed, micro-stepping drive techniques can produce a continuous range of partial steps.

With traditional thinking, the number of stator teeth cannot be higher than the number of rotor teeth, because of the need for a gap between stator pole shoes for a winding needle to pass through, which thereby limits the number of stator teeth that can be accommodated for any given size of motor. The conventional design means that the total number of stator teeth is less than the total number of rotor teeth. No step motors known to the inventor exist in the industry that have stator teeth equal or more in number than the rotor teeth.

SUMMARY DISCLOSURE

This invention breaks through the traditional engineering mindset and creates certain step angles where the number of stator teeth can be the same or more than the number of rotor teeth to thereby gain more torque for market needs. A hybrid stepper motor is provided in several embodiments, wherein the total number stator teeth is equal or greater than the total number of rotor teeth.

A step motor in accord with the present invention comprises a rotor and a stator winding assembly. The rotor has a plurality of rotor teeth, the number of teeth Nr equaling 360° divided by a specified full step angle. The rotor fits within the stator winding assembly and is seated by bearings on an axial shaft to rotate within the stator winding assembly. The stator winding assembly includes a stator with a plurality Nsp of stator poles wound with coils that can be driven in a series of phases to magnetically interact with the rotor. The stator poles have sets of stator teeth, wherein the total number of stator teeth on all poles of the stator, Ns≥Nr. Embodiments of two-phase, three-phase and five-phase bipolar step motors having 8, 9 and 10 stator poles, respectively, can be constructed.

An advantage is that the magnet from the rotor can generate more flux than the Ampere-Turns from the stator. The motor with more number of teeth on the stator will develop more torque. A motor in which the number of stator teeth is equal or more than the number of rotor teeth will always develop more torque than the conventional design.

DETAILED DESCRIPTION

Figure 1A:
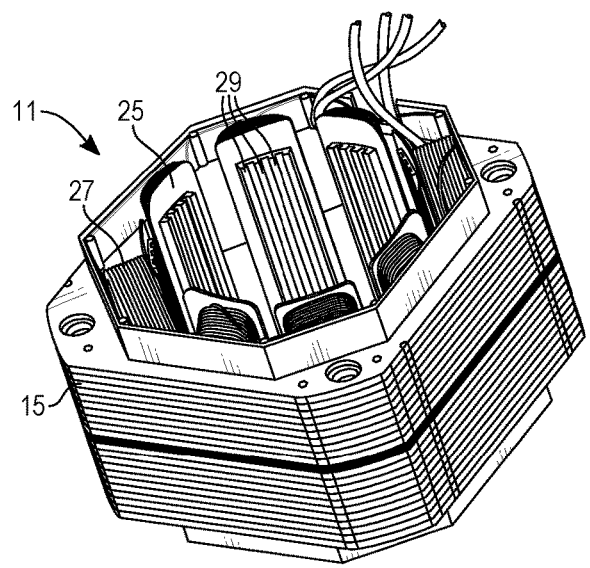
FIGS. 1A-1C are, respectively, a perspective view of the stator winding assembly, a cutaway perspective view of the stator winding assembly with rotor, and a side sectional view of the assembled motor, that together show the basic construction of an embodiment of a step motor in accord with the present invention.
Figure 1B:
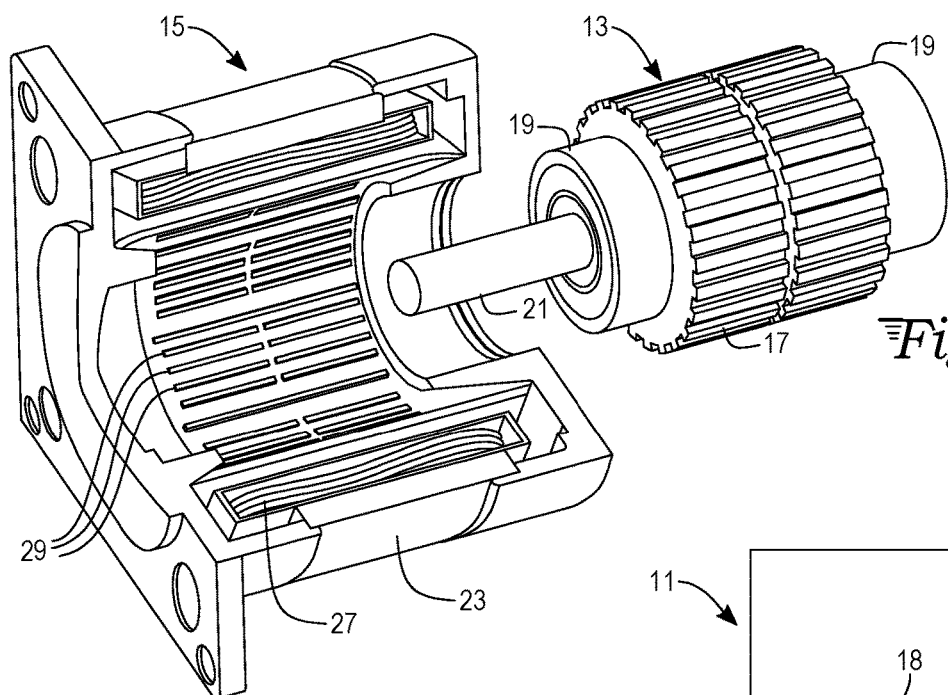
Figure 1C:
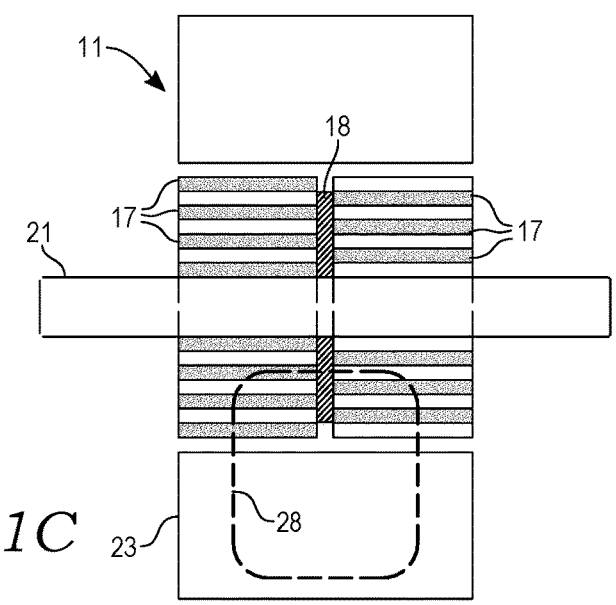

With reference to FIGS. 1A through 1C, a step motor 11 comprises both a rotor 13 and a stator winding assembly 15. The rotor 13 has a plurality Nr of rotor teeth 17, which may be offset in two sections sandwiching a magnet 18. The rotor 13 fits within the stator winding assembly 15 and is seated by bearings 19 on an axial shaft 21 to rotate within the stator winding assembly 15. The stator winding assembly 15 includes a stator 23 with a plurality Nsp of stator poles 25, each of which is wound with coils 27 that can be driven in a series of phases to magnetically interact 28 with the rotor 13. Each stator pole 25 has a plurality of stator teeth 29.

Figure 2:
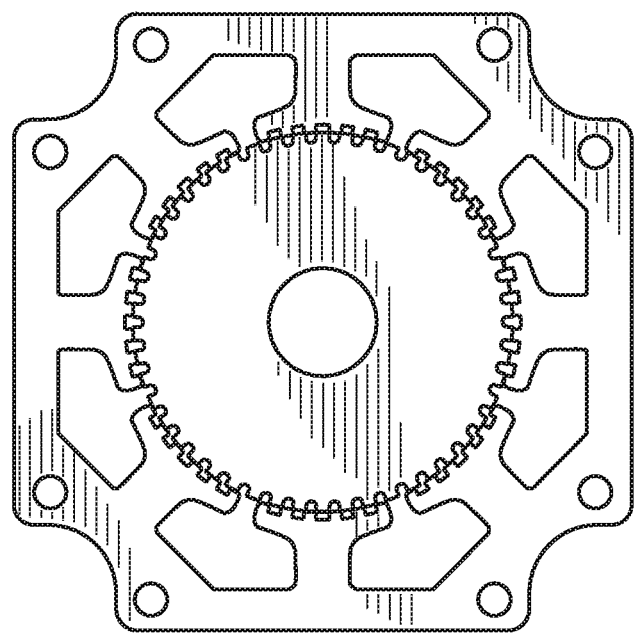
FIG. 2 is a cross-sectional view showing a conventional 200-stepper of the prior art having 8 stator poles and 6 teeth per stator pole. (Ns=48)<(Nr=50)

As seen in FIG. 2, a conventional step motor always has more rotor teeth than stator teeth. In this illustrative embodiment, the stator of a two-phase bipolar motor has 8 stator poles and 6 stator teeth per stator pole for a total of 48 stator teeth (Ns=48). The rotor has 50 rotor teeth (Nr=50), creating a 200-stepper with 1.8° full step angle.

Figure 3:
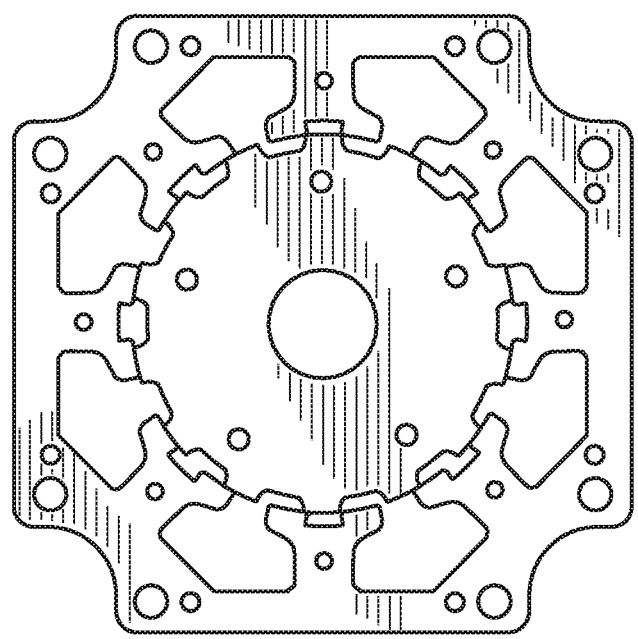
FIG. 3 is a cross-sectional view showing a 56-stepper embodiment of the invention (6.428571 . . . ° full step angle) having 8 stator poles with 2 teeth per pole. (Ns=16)>(Nr=14)
Figure 4:
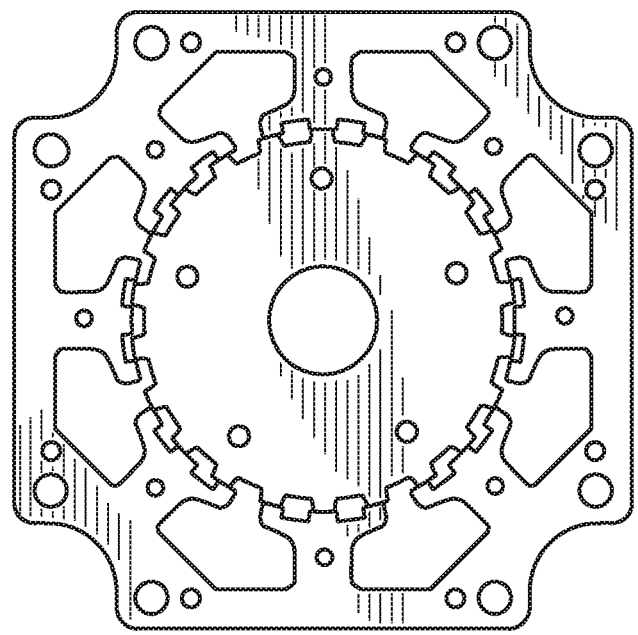
FIG. 4 is a cross-sectional view showing an 88-stepper embodiment of the invention (4.0909 . . . ° full step angle) having 8 stator poles with 3 teeth per pole. (Ns=24)>(Nr=22)
Figure 5:
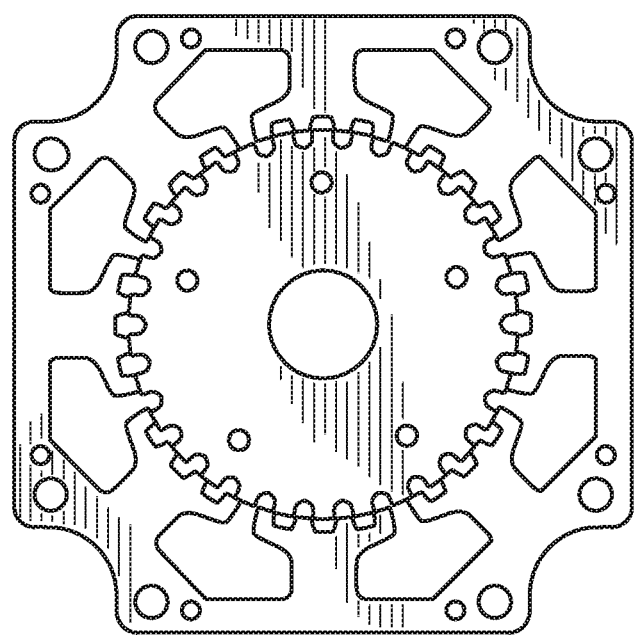
FIG. 5 is a cross-sectional view showing a 120-stepper embodiment of the invention (3° full step angle) having 8 stator poles with 4 teeth per pole. (Ns=32)>(Nr=30)
Figure 6:
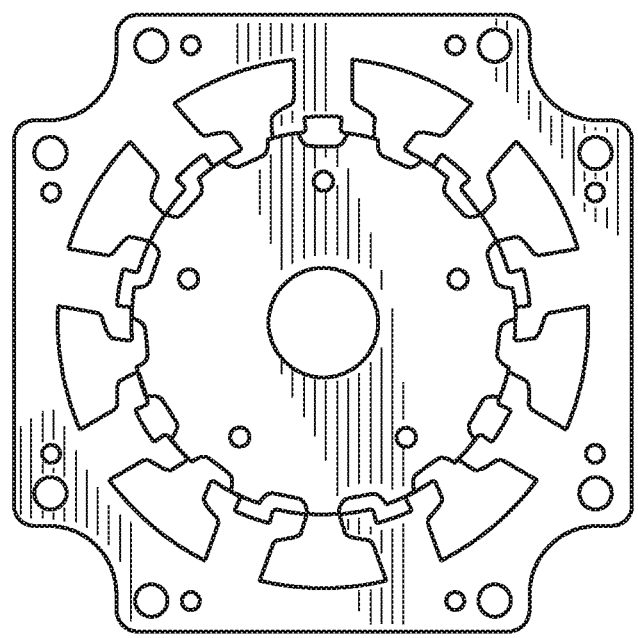
FIG. 6 is a cross-sectional view showing a 3-phase bipolar 90-stepper embodiment of the invention (4° full step angle) having 9 stator poles with 2 teeth per pole. (Ns=18)>(Nr=15)
Figure 7:
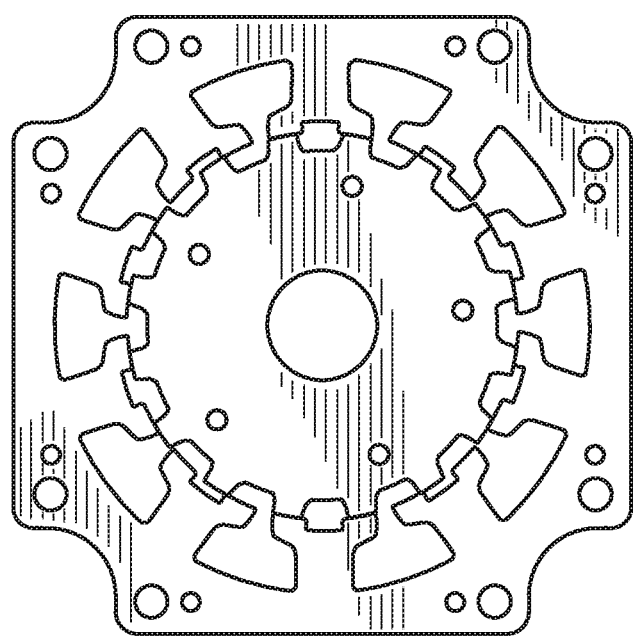
FIG. 7 is a cross-sectional view showing a 5-phase bipolar 160-stepper embodiment of the invention (2.25° full step angle) having 10 stator poles with 2 teeth per pole. (Ns=20)>(Nr=16)
Figure 8:
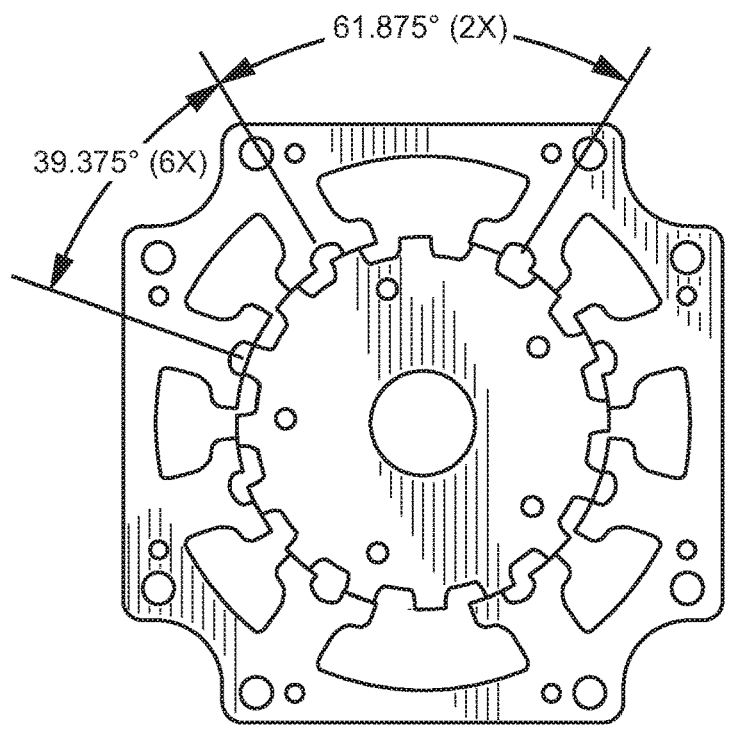
FIG. 8 is a cross-sectional view showing a 64-stepper embodiment of the invention (5.625° full step angle) having 8 non-uniform stator poles with 2 teeth per pole. (Ns=16)(Nr=16)

For example, a 56-stepper, 64-stepper, 88-stepper, 120-stepper, 90-stepper and 160-stepper, for a standard stator ID=1.375" (35 mm), has:
- Number of rotor teeth of a 56 stepper=14, the number of stator teeth=16 (FIG. 3)
- Number of rotor teeth of a 64 stepper=16, the number of stator teeth=16 (FIG. 8)
- Number of rotor teeth of a 88 stepper=22, the number of stator teeth=24 (FIG. 4)
- Number of rotor teeth of a 120 stepper=30, the number of stator teeth=32 (FIG. 5)
- Number of rotor teeth of a 90 stepper=15, the number of stator teeth=18 (FIG. 6)
- Number of rotor teeth of a 160 stepper=16, the number of stator teeth=20 (FIG. 7)

These examples have 8 stator poles except for the last two, which have 9 and 10 poles respectively. Since 8-stator pole, 9-stator pole and 10-stator pole are efficient designs and easy for manufacturing, we are focus on designs for these numbers of stator poles.

Let's define the total number of stator teeth Ns, and the total number for rotor teeth=Nr.

The design constraint for a uniform 8-stator pole (2-phase bipolar) is Nr/8 must be a decimal of n.25 or n.75 (or: Nr=8·k±2, where k is an integer); for a uniform 9-stator pole (3-phase bipolar motor) is Nr/9 must be an irrational number of n.33333 . . . or n.666666 . . . (Nr=9·k±3); for a uniform 10-stator pole (5-phase bipolar) is Nr/10 must be a decimal of n.1, n.9, n.4 or n.6 (Nr 10·k±1 or 10·k±4), where "n" is any integer including zero.

Since standard pitch angle P=360°/Nr, the constraint of Nr/8 can be re-written as 360°/P/8. The 360°/8 can be expressed as a general term of the angle (Sa) between center lines of the poles of the adjacent stator poles. Thus, Nr/8 or Nr/9 or Nr/10 can be expressed by a general term Sa/P.

1. Starting with 2 teeth per stator pole, the Ns=16. To satisfy the design constraints, the Nr less than 16 will be 14. (Nr/8=1.75) It is a 56 steps per revolution stepper shown in FIG. 3.

2. Next with 3 teeth per stator pole, Ns=24. To satisfy the design constraints, the Nr less than 24 will be 22. (Nr/8=2.75) It is an 88 steps per revolution stepper shown in FIG. 4.

3. Next with 4 teeth per stator pole, Ns=32. To satisfy the design constraints, the Nr less than 32 will be 30. (Nr/8=3.75) It is a 120 steps per revolution stepper shown in FIG. 5.

4. There is an example for a 3-phase bipolar stepper having 9 stator poles with 2 teeth per pole, i.e., Ns=18. To satisfy the design constraints, the Nr will be 15. (Nr/9=1.666 . . . ) It is a 90 steps per revolution stepper shown in FIG. 6.

5. There is also an example for a 5-phase bipolar stepper having 10 stator poles with 2 teeth per pole, i.e., Ns=20. To satisfy the design constraints, the Nr less than 20 should be 16. (Nr/10=1.6) It is a 160 steps per revolution stepper shown in FIG. 7.

6. There are a few special examples of non-uniform stator pole design of the invention:

6.1 A 2-phase bipolar stepper having 8 non-uniformed stator poles with 2 teeth per stator pole, Ns=16. In order to make Nr=Ns=16, the Sa must be modified to satisfy the design constraint. They are 39.375° (6 places) and 61.875° (2 places). P=360°/16=22.5, Sa/P=39.375°/22.5°=1.75 and 61.875°/22.5°=2.75 and (6×39.375°)+(2×61.875°)=360°. It is a 64 steps per revolution stepper shown in FIG. 8.

Figure 9:
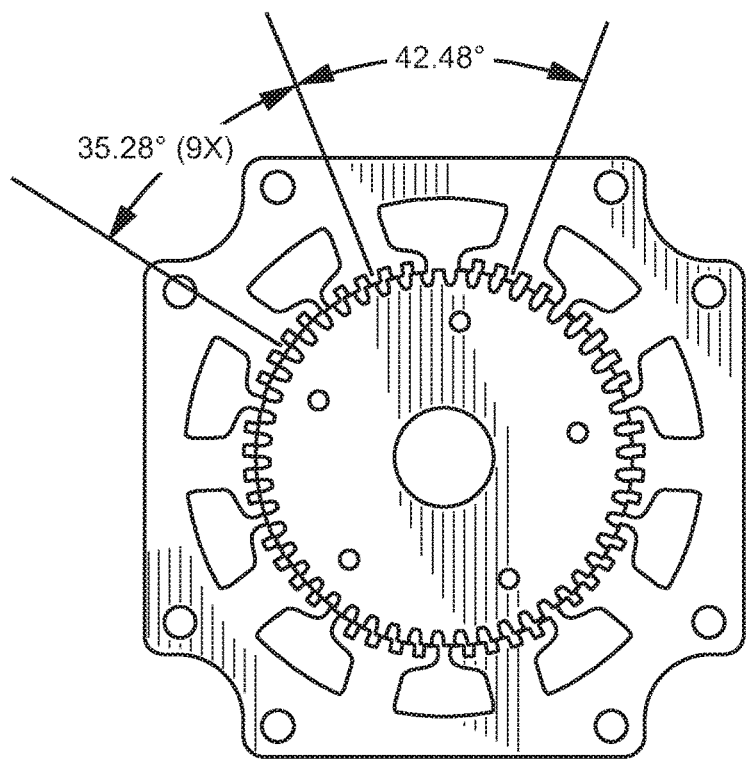
FIG. 9 is a cross-sectional view showing a 5-phase bipolar 500-stepper embodiment of the invention (0.72° full step angle) having 10 non-uniform stator poles with 5 teeth per pole. (Ns=50)=(Nr=50)

6.2 A 5-phase bipolar stepper having 10 non-uniform of stator poles with 5 teeth per pole, Ns=50. To make Nr=Ns, the Sa must likewise be modified to satisfy the design constraint. They are 35.28° (9 places) and 42.48° (1 place). P=360°/50=7.2°, Sa/P=35.28°/7.2°=4.9 and 42.48°/7.2°=5.9 and (9×35.28°)+(1×42.48°)=360°. It is a 500 steps per revolution stepper shown in FIG. 9.

To have Ns≥Nr, the design constraint needs to narrow to:
- Nr/8 or Sa/P must be a decimal of n.75 for a 2-phase bipolar stepper.
- Nr/9 or Sa/P must be an irrational number of n.666 . . . for a 3-phase bipolar stepper.
- Nr/10 or Sa/P must be a decimal of n.4, n.6 or n.9 for a 5-phase bipolar stepper.

Here are some lists of a few uniform stator pole designs of the invention where Ns≥Nr:

| 2-phase bipolar motor 8 uniform stator poles | | | |
|---|---|---|---|
| # of rotor teeth Nr | # of stator teeth Ns | Design constraint Nr/8 = n.75 | # of steps per revolution |
| 6 | 8 | 0.75 | 24 |
| 14 | 16 | 1.75 | 56 |
| 22 | 24 | 2.75 | 88 |
| 30 | 32 | 3.75 | 120 |
| 38 | 40 | 4.75 | 152 |
| 46 | 48 | 5.75 | 184 |
| 54 | 56 | 6.75 | 216 |
| 62 | 64 | 7.75 | 248 |
| 70 | 72 | 8.75 | 280 |
| 78 | 80 | 9.75 | 312 |
| 86 | 88 | 10.75 | 344 |
| 94 | 96 | 11.75 | 376 |

| 3-phase bipolar motor 9 uniform stator poles | | | |
|---|---|---|---|
| # of rotor teeth Nr | # of stator teeth Ns | Design constraint Nr/9 = n.666 . . . | # of steps per revolution |
| 6 | 9 | 0.666 . . . | 36 |
| 15 | 18 | 1.666 . . . | 90 |
| 24 | 27 | 2.666 . . . | 144 |
| 33 | 36 | 3.666 . . . | 198 |
| 42 | 45 | 4.666 . . . | 252 |
| 51 | 54 | 5.666 . . . | 306 |
| 60 | 63 | 6.666 . . . | 360 |
| 69 | 72 | 7.666 . . . | 414 |
| 78 | 81 | 8.666 . . . | 468 |
| 87 | 90 | 9.666 . . . | 522 |
| 96 | 99 | 10.666 . . . | 576 |

| 5-phase bipolar motor 10 uniform stator poles | | | |
|---|---|---|---|
| # of rotor teeth Nr | # of stator teeth Ns | Design constraint Nr/10 = n.4 or n.6 or n.9 | # of steps per revolution |
| 6 | 10 | 0.6 | 60 |
| 9 | 10 | 0.9 | 90 |
| 14 | 20 | 1.4 | 140 |
| 16 | 20 | 1.6 | 160 |
| 19 | 20 | 1.9 | 190 |
| 24 | 30 | 2.4 | 240 |
| 26 | 30 | 2.6 | 260 |
| 29 | 30 | 2.9 | 290 |
| 34 | 40 | 3.4 | 340 |
| 36 | 40 | 3.6 | 360 |
| 39 | 40 | 3.9 | 390 |
| 44 | 50 | 4.4 | 440 |
| 46 | 50 | 4.6 | 460 |

-continued

| | | | |
|---|---|---|---|
| 49 | 50 | 4.9 | 490 |
| 54 | 60 | 5.4 | 540 |
| 56 | 60 | 5.6 | 560 |
| 59 | 60 | 5.9 | 590 |
| 64 | 70 | 6.4 | 640 |
| 66 | 70 | 6.6 | 660 |
| 69 | 70 | 6.9 | 690 |
| 74 | 80 | 7.4 | 740 |
| 76 | 80 | 7.6 | 760 |
| 79 | 80 | 7.9 | 790 |
| 84 | 90 | 8.4 | 840 |
| 86 | 90 | 8.6 | 860 |
| 89 | 90 | 8.9 | 890 |
| 94 | 100 | 9.4 | 940 |
| 96 | 100 | 9.6 | 960 |

Note:
the # of steps per revolution shown in bold have rational step angles, which though not essential for operability, are especially desired by customers.

What is claimed is:

1. A 2-phase bipolar hybrid step motor, comprising:
a rotor with a plurality of rotor teeth in two offset sections sandwiching a magnet, the total number of teeth $N_r$ times four equaling the number of steps per revolution and the number of rotor teeth divided by eight $N_r/8$ having a decimal value of n.75, where n is an integer, the rotor fitting within a stator winding assembly and seated by bearings on an axial shaft to rotate within the stator winding assembly; and the stator winding assembly including a stator with eight stator poles wound with coils that can be driven in a series of phases to magnetically interact with the rotor, the stator poles having sets of stator teeth $N_s$, the stator characterized by the number of stator teeth $N_s \geq N_r$.

2. The step motor as in claim 1, wherein the motor is a two-phase bipolar motor with 8 uniform stator poles.

3. The step motor as in claim 1, the number of stator teeth $N_s=16$, and the number of rotor teeth $N_r=14$.

4. The step motor as in claim 1, the number of stator teeth $N_s=24$, and the number of rotor teeth $N_r=22$.

5. The step motor as in claim 1, wherein the number of stator teeth $N_s=32$, and the number of rotor teeth $N_r=30$.

6. The step motor as in claim 1, the number of stator teeth $N_s=16$, and the number of rotor teeth $N_r=16$, six adjacent pairs of the stator poles having a center-to-center separation of 39.375° and two pairs of adjacent stator poles on opposite sides of the stator having center-to-center separation of 61.875°.

* * * * *